(No Model.) 2 Sheets—Sheet 1.
E. THOMSON.
METHOD OF JOINING PIPES BY ELECTRICITY.
No. 385,384. Patented July 3, 1888.
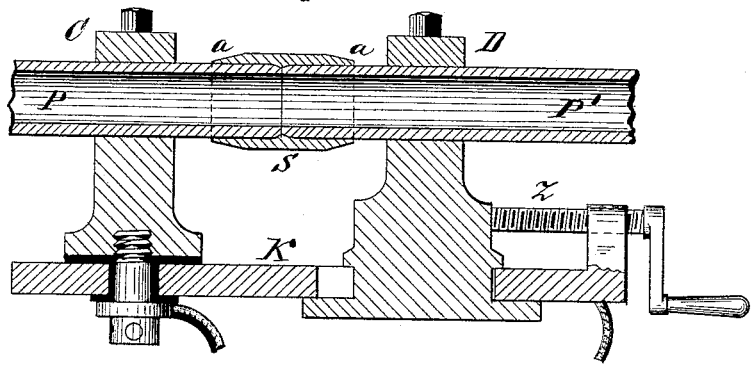
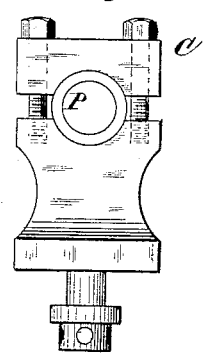
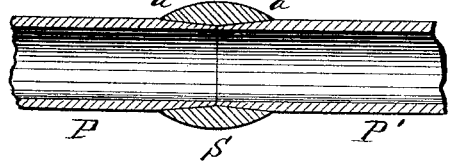
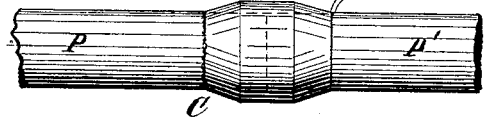
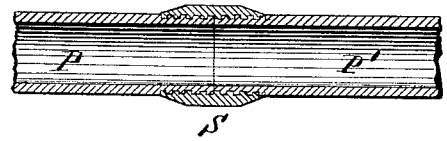
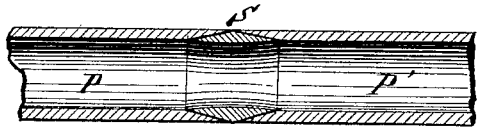
WITNESSES:
Gabriel J. W. Galster
Wm H. Capel
INVENTOR,
Elihu Thomson
BY
Townsend & MacArthur
ATTORNEYS.

(No Model.) 2 Sheets—Sheet 2.
E. THOMSON.
METHOD OF JOINING PIPES BY ELECTRICITY.
No. 385,384. Patented July 3, 1888.
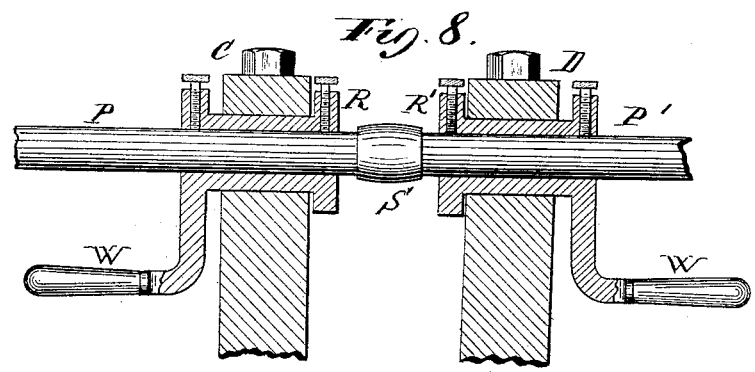
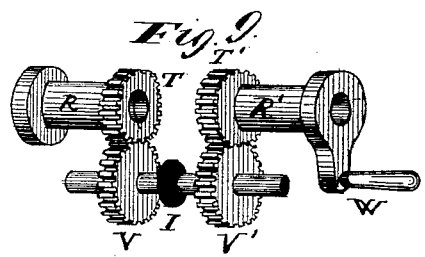
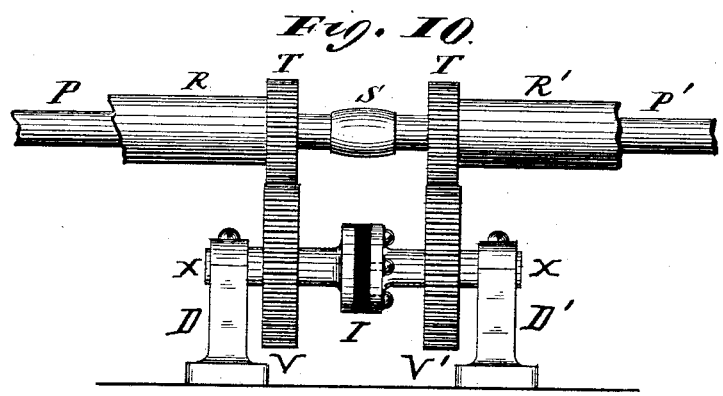
WITNESSES:
INVENTOR,
Elihu Thomson,
BY
ATTORNEYS.

UNITED STATES PATENT OFFICE.

ELIHU THOMSON, OF LYNN, ASSIGNOR TO THE THOMSON ELECTRIC WELDING COMPANY, OF BOSTON, MASSACHUSETTS.

METHOD OF JOINING PIPES BY ELECTRICITY.

SPECIFICATION forming part of Letters Patent No. 385,384, dated July 3, 1888.

Application filed August 22, 1887. Serial No. 247,506. (No model.)

*To all whom it may concern:*

Be it known that I, ELIHU THOMSON, a citizen of the United States, and a resident of Lynn, in the county of Essex and State of Massachusetts, have invented a certain new and useful Method of Joining Pipes by Electricity, of which the following is a specification.

The object of my invention is to produce tight and strong pipe-joints; and the invention consists in a novel method of producing or perfecting such joints, as well as in certain improved devices that are especially applicable to the method hereinafter described.

My invention may be applied to effecting joints between tubes of lead, tin, brass, copper, iron, &c., or between tubes of any different metals.

A joint produced according to my invention will stand very high pressures of gas or oil without leaking, and my invention is therefore especially applicable to laying lines of pipe for conveying natural gas or oil to a great distance.

Briefly, my invention consists in bringing the ends of the pipe to be united near or in abutment with a sleeve or a collar applied at the juncture, and then passing a heavy electric current through the parts of a volume sufficient to heat the same to a welding, brazing, or soldering temperature, so as to permit the sleeve to be firmly united to the ends of the pipes by welding through pressure or hammering, or by brazing or soldering, with preferably the application of proper soldering or brazing materials.

In the accompanying drawings, Figure 1 shows in side elevation an apparatus that may be used in practicing my invention, the pipes to be joined being shown in place. Fig. 2 is an end view of the apparatus. Fig. 3 illustrates one stage of the preferred method of carrying out the invention. Fig. 4 illustrates the joint at one stage of a modified process. Figs. 5, 6, and 7 show longitudinal sections of modified forms of joints. Figs. 8, 9, and 10 illustrate forms of apparatus by which the work may be rotated while it is in the clamps for the purpose of facilitating the formation of a uniform and perfect joint.

In Fig. 1 (shown in section) are the two pieces, P P', of pipe whose abutted ends are to be joined. They are held, as shown, in clamps C D, one of which appears on end in Fig. 2. The clamps are insulated from one another, and are connected by very solid and heavy conductors, relatively much larger than are shown in the figure, with a source of currents of sufficient power to heat that portion of the pipes between the clamps C D to the requisite temperature. Such source may be that described in my prior patent, No. 347,141. A sleeve, S, or short tube is placed so as to closely envelop the ends of the pipe or overlap upon the same in any desired way, and its edges are best made on a long taper or conical form at $a\ a$, as shown. It is best, though not essential to a joint, to make one clamp, as D, movable toward the other, as by a screw, Z, suitably operated.

Assuming that the pieces are in place as indicated in Fig. 1, the current passing from clamp to clamp soon brings the ends of pipes P P', where abutted, and the sleeve S either to a welding or brazing heat in accordance with the principles of my inventions in electric welding and soldering. If welding alone is to be done, the pipes are pressed together with a moderate force, which causes union and welding of their abutted ends in the middle of the sleeve S. This alone would give a tight joint; but I prefer, besides, to weld the sleeve S, or at least that portion of it which is thinned at $a\ a$, to the sides of the pipes P P'. This can be done by very rapid and light hammer-blows delivered around the pipes and sleeve edge at $a\ a$ after these parts have reached the welding heat. Compression of these parts will also produce a like result.

Instead of welding the joint, it may be brazed or soldered. In this case the parts are, during or after heating, coated with flux and solder applied at $a$, Fig. 3. If the tubes or pipes are lead or other soft metal, or if a soft-soldered joint is to be made, tallow, rosin, or zinc chloride is applied, with the usual alloys of tin and lead; or borax with brass is used for brazing.

Fig. 4 shows a joint at C and application of solder at B. This latter answers well for iron and steel pipe joints. If well done, the soldering gives a firm and strong joint which does not leak. The great advantage of the electric method over the mere application of external heat is in its diffusion through all parts of the metal, as the heat is produced all through and internally to the metal and a more uniform heating takes place than can otherwise be obtained.

In Fig. 5 the sleeve S is shown as modified so as to be tapered at its ends both outwardly and inwardly. It then receives tapered ends of the pipes P P'. The manner of forming the joints is substantially the same as in the forms Figs. 3 and 4, though simple pressure endwise of the pipes will give a fair welding, suitable for some purposes.

In Fig. 6 pipes with screw sleeves or couplings are shown. In such case the welding or brazing is used to so unite the parts that no leakage takes place, even though the threads do not fit perfectly.

In Fig. 7 the coupling-piece S is shown with an outward conical exterior, over which the ends of the pipes P P' are slipped, they being formed with a coned or flaring end for matching the taper on S. For welding, the piece S may best be of steel and the pipes P P' of milder steel or soft iron, for I find that a weld electrically made between iron and steel or mild steel with tool-steel is very strong. Besides, the steel S is stiff enough to keep the bore of the pipe from narrowing at the point during the welding. For brazing or soldering, the joint Fig. 7 is also a suitable form.

It is desirable in pipe and similar welding or soldering in which all sides have to be treated by hammering or application of solder, &c., that the piece be capable of rotation either during heating, welding, or soldering or thereafter. This cannot be done in all cases; but it is possible where the ends of the pipe are free and the pipes are straight or unencumbered.

Fig. 8 shows at R R' rotary holders for the pieces P P', made so as to clamp the latter and to be clamped in the clamps C D, but to be capable of rotation therein. If needed, a crank or wrench, W, may be used to effect this rotation around the axis of the pieces; but for good work it is desirable that parts R R' rotate together and not independently. By providing them with gears T T', Fig. 9, matched, and other gears, V V', carried on a rotary shaft in suitable bearings, any motion imparted to R' to rotate it will be carried to R, or vice versa. The parts R R' must be insulated electrically, as by the use of interposed insulation at I between parts of the shaft upon which V V' are carried.

Fig. 10 shows the insulation I as located between two flanges formed on the shaft X, which is made in two parts screwed together by insulated screws in the flanges.

The pieces of pipe P P', with the sleeve S carried thereby, may then be rotated together for hammering all round, or for inspection on all sides during the operation of joining in accordance with my invention.

The improvement in the method of soldering or brazing which consists in passing an electric current through the material to be brazed, and of a volume sufficient by its passage to raise the parts to brazing or soldering temperature, is not herein claimed, as it forms the subject of a separate application for patent filed by me August 22, 1887, Serial No. 247,507.

I have described one manner of passing the electric current through the material at the joint; but it will be understood that the parts might be included in the circuit of an electric current, so that the current would pass through the same in other directions, without departing from the spirit of my invention.

I make no claim herein to the combination, with the sections of pipe, of the tapered sleeve or tube S, united thereto by electric welding or soldering, as this will form the subject of a separate application for patent. Nor do I claim herein an electric welding or soldering apparatus having rotary chucks or holders provided with means for causing simultaneous equal rotation thereof, as this device likewise will be embodied in a separate patent.

What I claim as my invention is—

1. The herein-described method of uniting sections of pipe, consisting in applying a sleeve or collar or coupling-tube to the adjoining ends of the sections, and then passing a heavy electric current through the parts to effect a union of the sleeve and pipe, thus completing the joint.

2. The herein-described method of making pipe-joints, consisting in passing a heavy electric current, as described, through the sleeve or collar or coupling at the abutting ends of the pipes, and of a volume sufficient to raise the parts to welding temperature, and then welding the sleeve or its equivalent and the pipes together, as and for the purpose described.

Signed at Lynn, in the county of Essex and State of Massachusetts, this 18th day of August, A. D. 1887.

ELIHU THOMSON.

Witnesses:
GEORGE STUART,
OTIS K. STUART.